United States Patent
Waddell et al.

(10) Patent No.: US 7,644,028 B2
(45) Date of Patent: Jan. 5, 2010

(54) PAIR LIBRARY TRADING SYSTEM AND METHOD

(75) Inventors: William Matthew Waddell, Rye, NY (US); Mordechai Finkelstein, Tenafly, NJ (US)

(73) Assignee: Morgan Stanley, New York, NY (US)

( * ) Notice: Subject to any disclaimer, the term of this patent is extended or adjusted under 35 U.S.C. 154(b) by 1434 days.

(21) Appl. No.: 10/264,722

(22) Filed: Oct. 4, 2002

(65) Prior Publication Data
US 2003/0101129 A1   May 29, 2003

Related U.S. Application Data

(60) Provisional application No. 60/334,163, filed on Nov. 29, 2001.

(51) Int. Cl.
*G06Q 40/00* (2006.01)

(52) U.S. Cl. ...................................................... 705/37

(58) Field of Classification Search ............... 705/1–45; 100/301; 208/49; 264/248; 340/545; 428/160
See application file for complete search history.

(56) References Cited

U.S. PATENT DOCUMENTS

| | | | |
|---|---|---|---|
| 5,101,353 A * | 3/1992 | Lupien et al. ................. | 705/37 |
| 5,168,446 A | 12/1992 | Wiseman | |
| 5,243,331 A | 9/1993 | McCausland et al. ....... | 345/172 |
| 5,774,880 A | 6/1998 | Ginsberg ..................... | 705/36 |
| 5,852,811 A * | 12/1998 | Atkins ........................ | 705/36 R |
| 5,857,176 A * | 1/1999 | Ginsberg ................. | 705/36 R |
| 6,112,189 A * | 8/2000 | Rickard et al. ............ | 705/36 R |
| 6,272,474 B1 * | 8/2001 | Garcia ........................ | 705/36 R |
| 6,282,521 B1 | 8/2001 | Howorka | |
| 6,317,727 B1 | 11/2001 | May | |
| 6,321,212 B1 | 11/2001 | Lange | |
| 6,421,653 B1 | 7/2002 | May | |
| 2002/0016761 A1 * | 2/2002 | Foster et al. ................. | 705/37 |
| 2002/0161690 A1 * | 10/2002 | McCarthy et al. ............ | 705/37 |

OTHER PUBLICATIONS

Calculated risk. (computer run investment portfolio), Clements, Jonathan, Forbes, v143, n13, p. 248(2), Jun. 26, 1989.*
Hedge funds, leverage, and the lessons of Long-Term Capital Management, Financial Market Trends, 73, 51(4), Jun. 1999.*
Alternative reinsurance: Using catastrophe bonds and insurance derivatives as a mechanism for increasing capacity in the insurance markets, Jones, George B IV, CPCU Journal v52n1 pp. 50-54, Spring 1999.*
Int'l Search Report for PCT/US02/37922 dated Mar. 27, 2003.
Ruggiero, Murray A. Jr.; Equity futures: Trades site in this bold new market; Futures; v30; n1; pp. 58-61; Sep. 2001.

(Continued)

*Primary Examiner*—Mary Cheung
*Assistant Examiner*—Tien C Nguyen
(74) *Attorney, Agent, or Firm*—Weitzman Law Offices, LLC (57) ABSTRACT

A method for trading a pair of securities is provided and includes the step of retrieving a previously configured pair trade request and the previously configured pair trade request is submitted to a pair trade fulfillment module.

27 Claims, 4 Drawing Sheets

OTHER PUBLICATIONS

Financial Times; Japn ed.; 'Spiders' and 'vipers' find favour in the equity jungle; Section: Global Investment Fund Management; Apr. 7, 2002.

John Downes, Dictionary of Finance and Investment Terms, 1998, Barron's Educational Series Inc, Fifth Edition, pp. 328, 526.

Spiro, L. et al., It wasn't just the bond market that LTCM endangered, Business week, Nov. 9, 1998, No. 3603, p. 160.

"GIB wins European Hedge Fund Award", Emerging Markets Daftafile, Bahrain Tribune, Jun. 12, 2001.

J. Chernoff, "Hedge fund strategies may be time bombs; Short tenures tend to inflate Sharpes", Investment News, pp. 24May 14, 2001.

M. O'Brien, "Brent Nyitray and Daniel Morgan Join Bear Stearns Relative Value Desk", Business Wire, Jan. 25, 2001.

M. Fischer, "Conservative, value-focused approach to asset allocation", MAR/Hedge, Fund of Funds Review; No. 76; pp. 22, Apr. 2000.

A. Capon, "Beyond the price imperative", International Securities Lending Fourth Quarter 1999, pp. 12-22; ISSN: 09649301, Fourth Quarter 1999.

J. Ogden, "HSBC set to blaze alternative trail to fund investment; HSBC hedges bets in new trend", South China Morning Post, Sunday Money; pp. 10, Jul. 11, 1999.

H. Rossman, "Alternative strategies: Risks, rewards and considerations", Trusts & Estates, vol. 134n5, pp. 32-40, May 1995.

J. Newman, "Long and Short of CFD (contracts for difference)", Money Marketing, vol. 64, Nov. 9, 2000.

M. Garvey et al.,: "How brokers facilitate trade for long-term clients in competitive securities markets"., Journal of Business, vol. 68, n1, p. 1 (33), Jan. 1995.

"Canadian Quantex User Manual", RBC Dominion Securities Inc., vol. 1: Trade Execution, 1992.

* cited by examiner

PAIR LIBRARY TRADING SYSTEM AND METHOD

CROSS-REFERENCE TO RELATED APPLICATION

This application claims the benefit of the filing date of U.S. provisional application serial No. 60/334,163 entitled "Method and System for Trading Pairs of Securities," that was filed on Nov. 29, 2001, the contents of which are incorporated by reference herein.

BACKGROUND

The following invention relates to a system and method for trading securities and, in particular, for a system and method of submitting pair trade requests.

A recognized strategy for trading securities is known as pair-trading. Pair-trading is a non-directional investment strategy in which the investor identifies two securities having similar characteristics and the securities are currently trading at a price relationship that is out of their historical trading range. The investor exploits the price relationship between the securities by buying the undervalued security while short-selling the overvalued security. Because pair-trading is a market-neutral strategy, it is a particularly desirable strategy for investing in volatile markets.

One context in which pair trading is useful is where an investor desires to take advantage of an arbitrage opportunity resulting from a merger between two companies. For example, Company A has announced a definitive agreement to acquire Company T in which case Company T shareholders will receive 0.5 shares of Company A stock for each share of Company T stock they own. The investor desires to capture the "spread" between the offered consideration (0.5 shares of A) and the price of T stock. To do this, the investor buys shares in T stock and sells shares of A stock.

For instance, if stock T is trading at $28 per share and stock A is trading at $60 per share, then the investor may execute a trade for 200,000 spreads by buying 200,000 shares of T stock and selling 100,000 shares of A stock. After the merger takes place, the investor will cover the short position in stock A with the 100,000 shares of A stock the investors receives in exchange of the 200,000 shares the investor held of stock T. Thus, by executing the pair trade, the investor locks in a $400,000 profit (assuming that the merger goes through).

An investor desiring to execute a pair trade first formulates a pair trade request. A pair trade request is characterized by a plurality of parameters including, for example, a spread quantity, a buy ticker, a sell ticker, a buy trading ratio, a sell trading ratio, whether to trade oddlots, whether to execute a short sale, whether to work the bid side of a spread (i.e., buy stock first and take short-sale execution risk), a minimum wave size (i.e., the minimum share amount per tranche), a maximum wave size (i.e., the maximum share amount per tranche), a slippage factor, a wave stop loss unit, a nuisance cancel amount, an improve cancel unit, a minimum order distance, an order limit type (e.g., dollar difference, percent premium or discount, sell over buy or buy over sell, cash-adjusted) and order limit parameters (e.g., buy calculation ratio, sell calculation ratio, cash offset). Once a pair trade request is formulated, the investor typically presents the pair trade request to a broker affiliated with a financial institution for execution.

Because the formulation of a pair trade request requires that the investor specify numerous parameters, it takes time for the investor to prepare and submit a pair trade request to exploit a particular market condition. This time required may cause an investor to miss a potentially profitable trading opportunity, especially in fast-moving markets.

Accordingly, it is desirable to provide a system and method for submitting pair trade requests.

SUMMARY OF THE INVENTION

The present invention is directed to overcoming the drawbacks of the prior art pair trading practices. Under the present invention a method for trading a pair of securities is provided and includes the steps of retrieving a previously configured pair trade request and the previously configured pair trade request is submitted to a pair trade fulfillment module.

In an exemplary embodiment, the method includes the step of archiving at least one past pair trade in a pair trade archive and further includes the step of retrieving the at least one past pair trade from the pair trade archive.

In an exemplary embodiment, the method includes the step of storing at least one pre-defined pair trade request in a pair trade library and further includes the step of retrieving the at least one pre-defined pair trade from the pair trade library.

In an exemplary embodiment, the at least one pre-defined pair trade is formulated by a pair trader.

In an exemplary embodiment, the method includes the step of retrieving a previously configured pair trade request based on at least one search criteria.

In an exemplary embodiment, the at least one search criteria is a date.

In an exemplary embodiment, the at least one search criteria is selected from a group including a trader name and a security name.

In an exemplary embodiment, the previously configured pair trade request includes a plurality of parameters and the method further includes the step of modifying at least one of the plurality of parameters.

In an exemplary embodiment, the plurality of parameters includes parameters from the group including a buy symbol, a buy quantity, a sell symbol, a sell quantity, a buy ratio, a sell ratio, a minimum wave amount, a maximum wave amount and a slippage amount.

In an exemplary embodiment, the previously configured pair trade request includes a plurality of parameters and further includes step of providing a shortcut for automatically modifying at least one of the plurality of parameters according to a trading strategy.

In an exemplary embodiment, the shortcut is selected from the group including Flip with Short, Flip with Long, Toggle Short and Order Unfilled Quantity.

Under the present invention, a system of trading a pair of securities is provided and includes a pair trade fulfillment module for fulfilling a pair trade request. Also included is a pair trade store for storing previously configured pair trades. At least one of the previously configured pair trades is retrieved from the pair trade store and is submitted to the pair trade fulfillment module.

In an exemplary embodiment, the pair trade store is a pair trade archive for storing past pair trades.

In an exemplary embodiment, the pair trade store is a pair library for storing pre-defined pair trades.

Accordingly, a method and a system are provided for trading pair securities.

The invention accordingly comprises the features of construction, combination of elements and arrangement of parts that will be exemplified in the following detailed disclosure, and the scope of the invention will be indicated in the claims.

Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which.

DETAILED DESCRIPTION OF THE PREFERRED EMBODIMENTS

Figure 1:
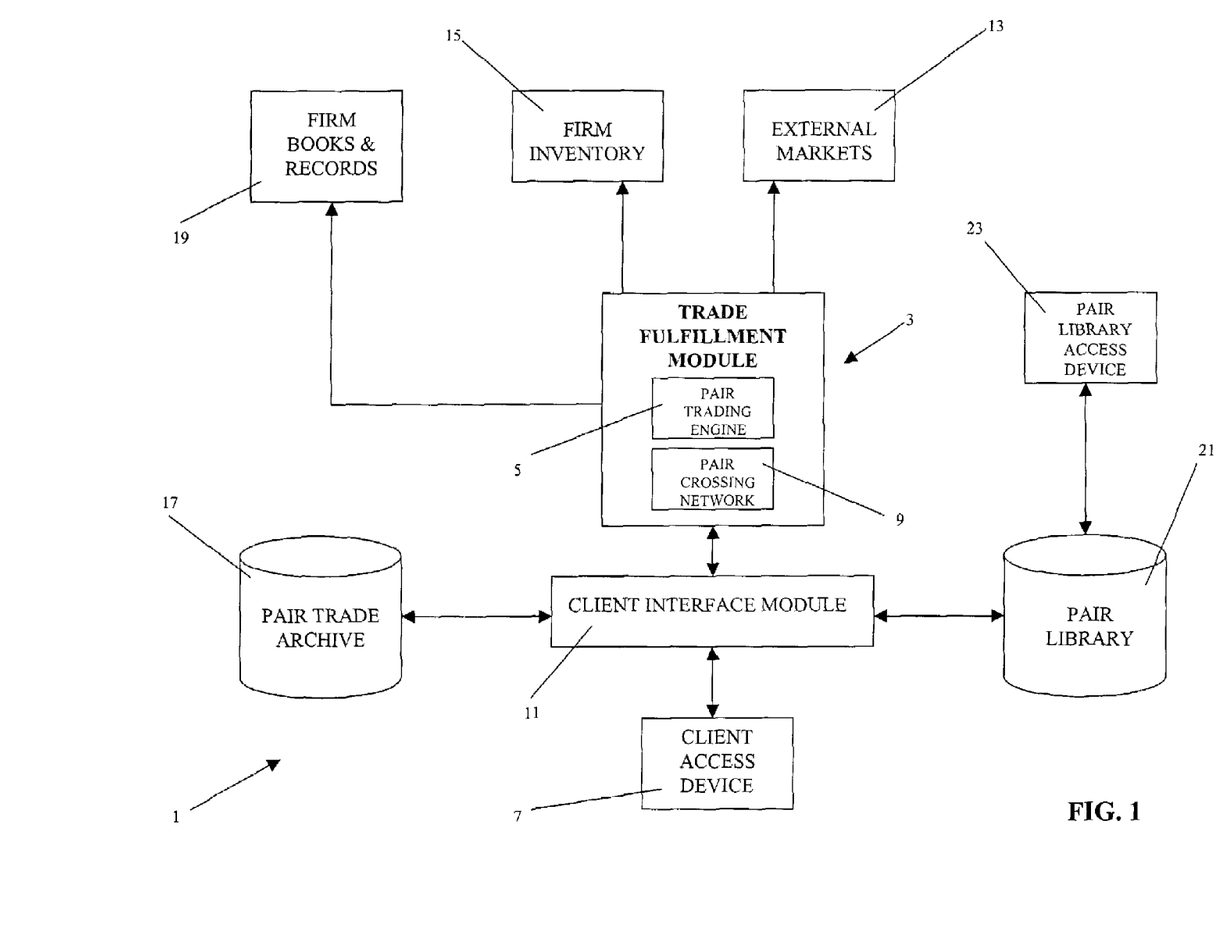
FIG. 1 is a block diagram of a pair trading system according to the present invention.

Referring now to FIG. 1, there is shown a block diagram of a pair trading system 1 according to the present invention. System 1 receives pair trade requests from clients operating client access device 7 and attempts to fill the pair trade requests according to the parameters associated with the particular pair trade request. System 1 includes a pair trade fulfillment module 3 for fulfilling pair trade requests received from clients. In an exemplary embodiment, pair trade fulfillment module 3 includes a pair trading engine 5 and/or a pair crossing network 9 for filling pair trade requests. Based on market conditions and/or preferences included in the pair trade request, pair fulfillment module 3 routes the pair trade request (either in whole or in part) to either pair trading engine 5 or pair crossing network 9 for fulfillment. For example, pair fulfillment module 3 may route a pair trade request to pair trading engine 5 that then attempts to fill trade request by executing the appropriate trades in an external market 13 (that may include, by way of non-limiting example, the New York Stock Exchange, the NASDAQ or any other financial market), or against an inventory 15 of trade request maintained by a financial institution. In addition, trade fulfillment module 3 may also fill (in whole or in part) a pair trade request by forwarding the trade request to pair crossing network 9 for matching with other pair trade requests. If a pair trade request is routed to pair crossing network 9, pair crossing network 9 fulfills the request (in whole or in part) by matching it against another pair trade request received by pair crossing network 9, by matching the request against inventory 15 controlled by the financial institution and/or by forwarding the trade request to pair trading engine 5 for execution in external markets 13.

In operation, system 1 may fulfill a pair trade request either using pair trading engine 5, or pair crossing network 9, or a combination of the two. For example, a pair trade request received by system 1 may be completely filled by pair trading engine 5 as follows.

Assume a case where XYZ is taking over ABC and is offering 0.575 shares of XYZ for each ABC share and investor Arb wants to invest in the price difference between ABC stock and XYZ stock. To take advantage of the price difference, Arb wants to lock in the difference between the value offered (0.575 * XYZ stock) and the value of ABC stock by buying ABC stock and selling XYZ stock subject to the condition that ABC−0.575 XYZ<=−$1.19 (i.e., Arb desires to capture a $1.19 difference between XYZ's takeover offer and ABC's share price).

In order to fill this pair trade, Arb presents a pair trade request to client interface module 11 (using client access device 7). The pair trade request typically includes a number of parameters that define the pair trade and that also may be used by client interface module 11 in determining how the pair trade request is to be filled. Arb typically indicates in the trade request the number of spreads the Arb desires to invest in and also provides a minimum and maximum share amount that he is willing to trade per tranche.

For example, Arb may indicate a desire to invest in 100,000 spreads and may only wish to trade the spread 3,000-8,000 shares at a time. Arb generally sets this tranche size range based on the liquidity and volatility of ABC stock and XYZ stock. Arb may set a larger minimum tranche size if ABC stock and XYZ stock are fairly liquid stocks because higher liquidity increases the likelihood that a larger tranche size will be executed. Arb may set a lower maximum tranche size if XYZ stock and ABC stock are volatile stocks so as to limit the "leg risk" associated with executing a pair trade.

Yet another pair trade parameter Arb provides is the spread limit (in the above case −1.19) which is the amount Arb desires to capture in the trade. Arb does not have to provide, however, the discrete prices at which trades for ABC and XYZ stock are to be executed as these prices are calculated by pair trading engine 5 (and/or pair crossing network 9).

System 1 also includes a pair trade archive 17 in communications with pair fulfillment module 3 for storing all pair trade requests received by pair fulfillment module 3. In an exemplary embodiment, pair trade archive 17 is a database file having a record format for storing all the parameters for the particular pair trade request. In addition, additional fields in the record are included for identifying the trader that forwarded the particular pair trade request, whether the trade was filled (in whole or in part), when the trade was filled, what portions of the trade were filled by pair trading engine 5 (if any), what portions of the trade were filled by pair crossing network (if any), as well as fields for any other desired parameter.

In an exemplary embodiment, client interface module 11 provides the client with a graphical user interface (GUI) via which the client can browse through past pair trade requests stored in pair trade archive 17 or can search through past pair trade requests based on various search criteria. The search criteria may include, by way of non-limiting example, the securities included in the trade request, the trader that formulated the pair trade request, the date of the trade request. The GUI also enables the client to examine all the information associated with a particular pair trade request that is stored in pair trade archive 17. Alternatively, client access device may include a GUI via which the client accesses client interface module 11 for browsing past pair trade requests.

Figure 2:
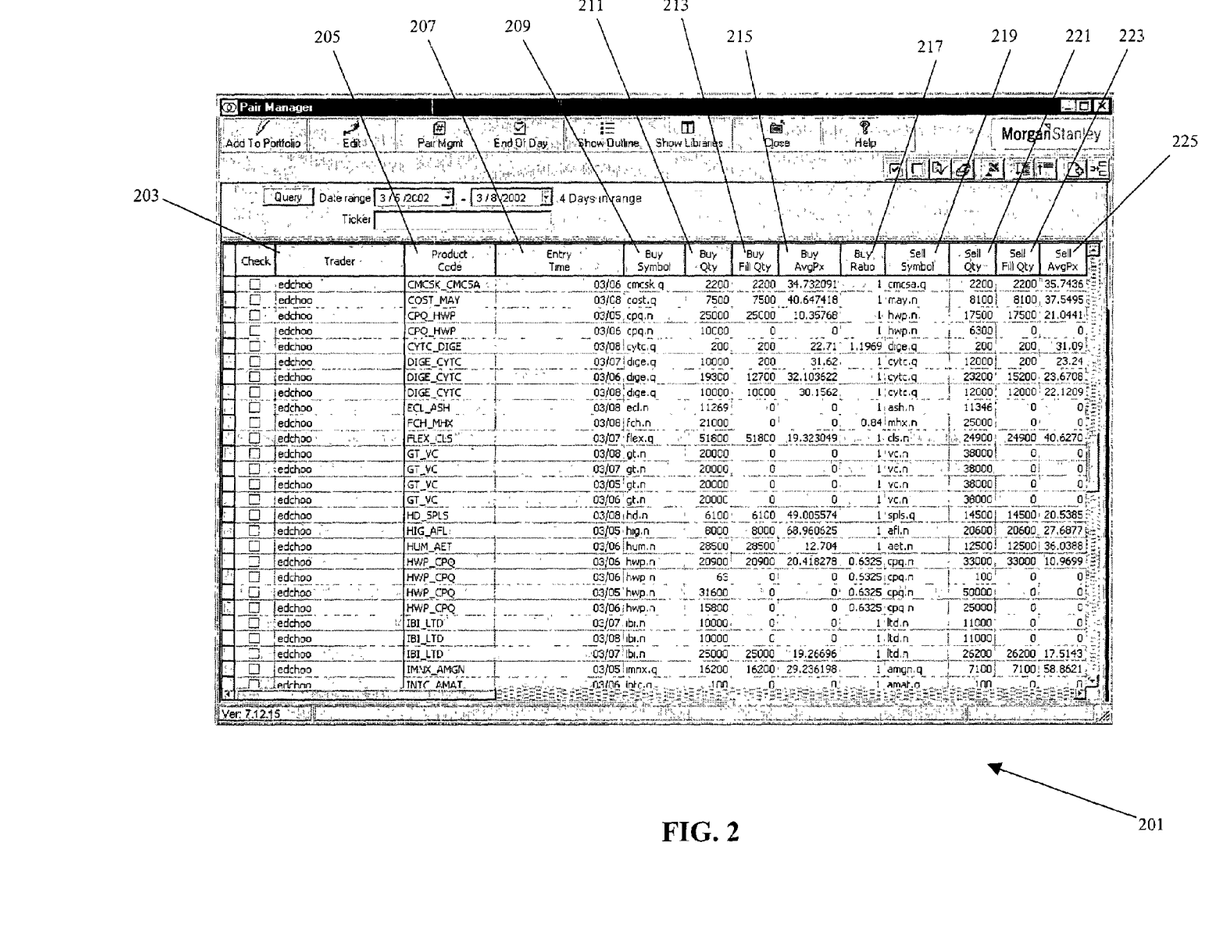
FIG. 2 is a screenshot of a listing of past pair trades retrieved from a pair trade archive of the system of FIG. 1.

Referring now to FIG. 2, there is shown a screenshot 201 of a listing of past pair trades that fall within a date range of Mar. 5, 2002 to Mar. 8, 2002 that were retrieved from pair trade archive 17. Screenshot 201 includes various fields associated with each displayed trade request including a trader field 203, a product code field 205 (that stores the product code for a security pair), an entry time field 207 (date of entry), a buy symbol field 209 (that stores the stock symbol for the security that is to be bought), a buy quantity field 211 (that stores the number of shares of the buy symbol that is to be bought), a buy fill quantity field 213 (that stores the total number of shares of the buy symbol that was bought on a specified day, if applicable), a buy average price field 215 (that stores the average price of the buy symbol shares that were bought on a specified day, if applicable), a buy ratio field 217 (that stores the ratio of buy symbol shares to the total number of spreads to be transacted), a sell symbol field 219 (that stores the stock symbol for the security that is to be sold), a sell quantity field 221 (that stores the total number of shares of the sell symbol that is to be sold on a specific day, if applicable), sell fill quantity field 223 (that stores the total number of shares of the sell symbol that were sold on a specific day, if applicable), a sell average price field 225 (that stores the average price of the sell symbol shares that were sold on a specific day, if applicable), a sell ratio field (not shown) (that stores the ratio of sell symbol shares to the total number of shares that are to be transacted), a minimum wave amount (not shown), a maximum wave amount (not shown) and a slippage amount (not shown) (that is a user-specified offset to the user's spread limits that is used by trade fulfillment module 3 to modify the specified spread limits). Other fields that may be included are a wave stop loss unit (i.e., indicates when an existing cover order is to be cancelled and a more aggressive price is to be paid with the difference being accepted as a "leg"), a nuisance cancel amount (i.e., the de minimis amount by which the good quantity must change before an existing initiating order is cancelled and replaced with a fresh quantity), an improve cancel unit (i.e., indicates when an existing order is cancelled to improve an initiating order) and a minimum order distance (i.e., indicates how close to the inside market an initiating order price must be before an order is sent). In addition, any other desirable fields may be displayed to the client in a similar or any suitable manner.

If the client desires to form a trade request based on a past pair trade request stored in pair trade archive 17, the client may select the desired past trade request (for example, by clicking on the particular past trade request displayed in screenshot 201 using a pointing device) for further review and/or modification. The client may then modify any of the pair trade request parameters to suit a particular trading situation. In an exemplary embodiment, aside from the client directly modifying the pair trade parameters, the GUI includes shortcuts (such as buttons) for modifying the pair trade parameters automatically in a predefined manner. For example, the GUI may include a shortcut called "Flip w/Short" in which the system switches the buy and sell tickers, switches the buy and sell ratios and designates the sale as a short-sale. The Flip w/Short shortcut is useful where a trader wants to reinitiate a recently unwound trade. The GUI may include a "Flip w/Long" shortcut in which the system switches the buy and sell tickers, switches the buy and sell ratios and designates the sale as a long-sale. The Flip w/Long shortcut is useful where a trader wants to unwind a recently initiated trade. The GUI may include a "Toggle Short" shortcut in which the system toggles the sell designation as short or long. The GUI may also include a "Order Unfilled Quantity" shortcut in which the system reduces a past order by the executions of a reference day. This shortcut is useful where a trader wants to continue trading the residual of a previous day's order. In addition, other shortcuts may be provided to simplify the process of modifying a past pair trade to suit a particular trading situation.

Once the client either modifies the pair trade parameters or determines that the parameters are suitable without modification, the client may forward the pair trade request to trade fulfillment module 3 with a single keystroke or mouse click (or any other suitable user interface technique). Thus, by retrieving a past pair trade from pair trade archive 17 and modifying it as required, the client is able to form and submit a pair trade request rapidly.

System 1 also includes a pair library 21 that includes predefined pair trades having parameters that are designed to exploit a particular market condition. These pair trades may be formed by a pair trader on behalf of a financial institution and are input into pair library 21 via a pair library access device 23 (for example, a personal computer in communications with pair library 21). In this way, the client has access to pair trades constructed by a professional pair trader that is closely tracking the markets. As in the case with past pair trades stored in pair trade archive 17, a client may access the pair trades stored in pair library 21 via the GUI associated with client interface module 11.

In an exemplary embodiment, the pair trades stored in pair library 21 are "pushed" to client access device 7 (via client interface module 11) so that client access device 7 contains all the pair trades included in pair library 21 at any given time. The pair trades in pair library 21 may be communicated to client access device 7 at any time using any communications medium such as, by way of non-limiting example, the Internet. Preferably, the pair trades are communicated to client access device 7 during time periods of lower activity over the communications medium. The benefit of communicating all the pair trades in pair library 21 to client access device 7 is that users will have faster access to the pair trades than if they had to access pair library 21 directly during peak trading times.

Figure 3:
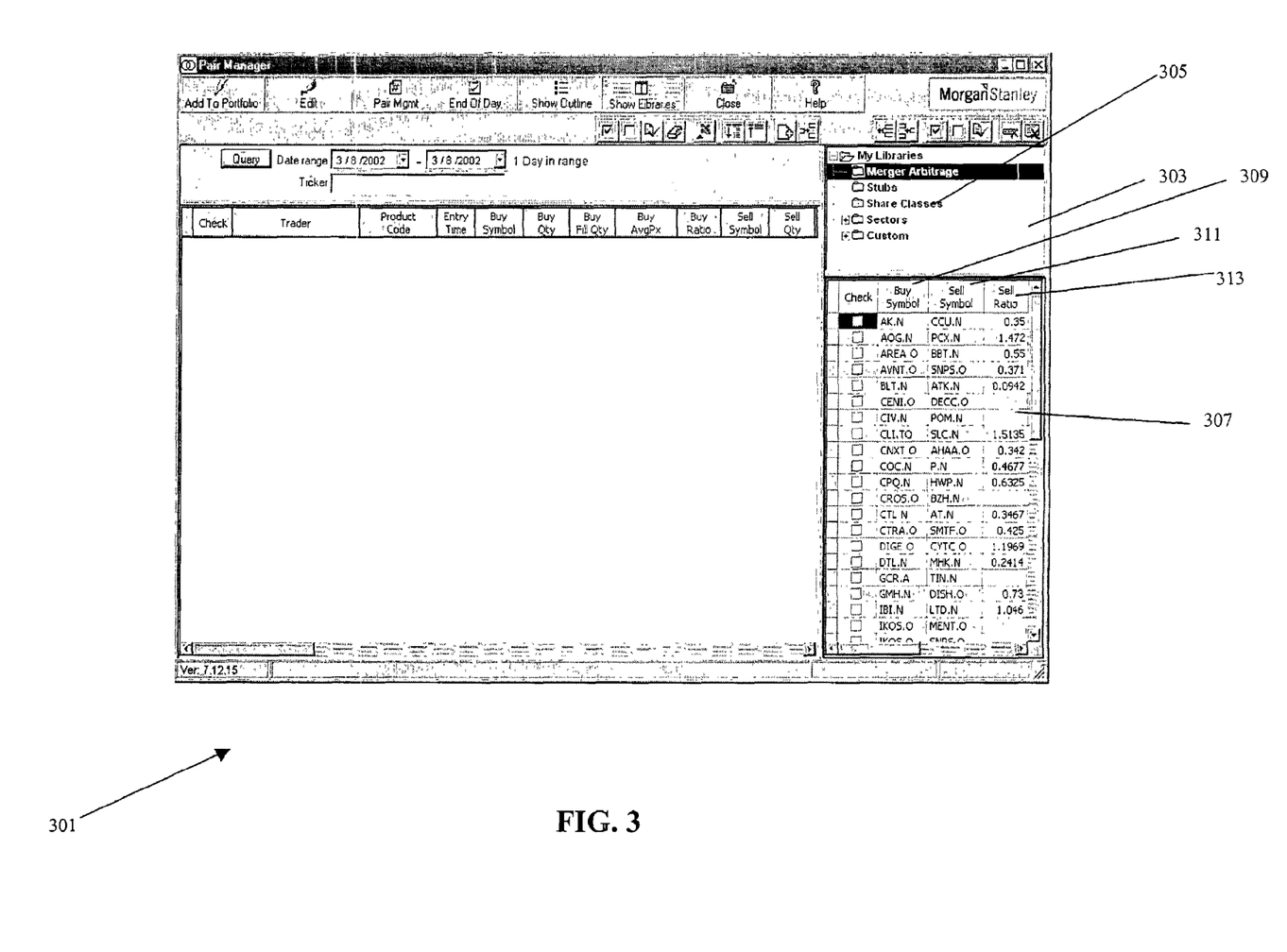
FIG. 3 is a screenshot of a listing of pair trades retrieved from a pair library of the system of FIG. 1.

Referring now to FIG. 3, there is a screenshot 301 of a listing of pair trades retrieved from pair library 21. Screenshot 301 includes a directory frame 303 in which the client can navigate a directory tree 305 according to which the pair trades in pair library 21 are organized. Also included is a search results frame 307 that displays the parameters of all the pre-defined pair trades that correspond to the selection in directory tree 305. Search results frame 307 displays all the pre-defined parameters associated with a particular pair trade including a buy symbol 309, a sell symbol 311, a sell ratio 313, a buy ratio (not shown) as well as any other parameters. To choose a particular pair trade, the client selects one of the displayed pair trades in search results frame 307 in any convenient manner such as, by way of non-limiting example, double-clicking on the particular pair trade with a pointing device.

Figure 4:
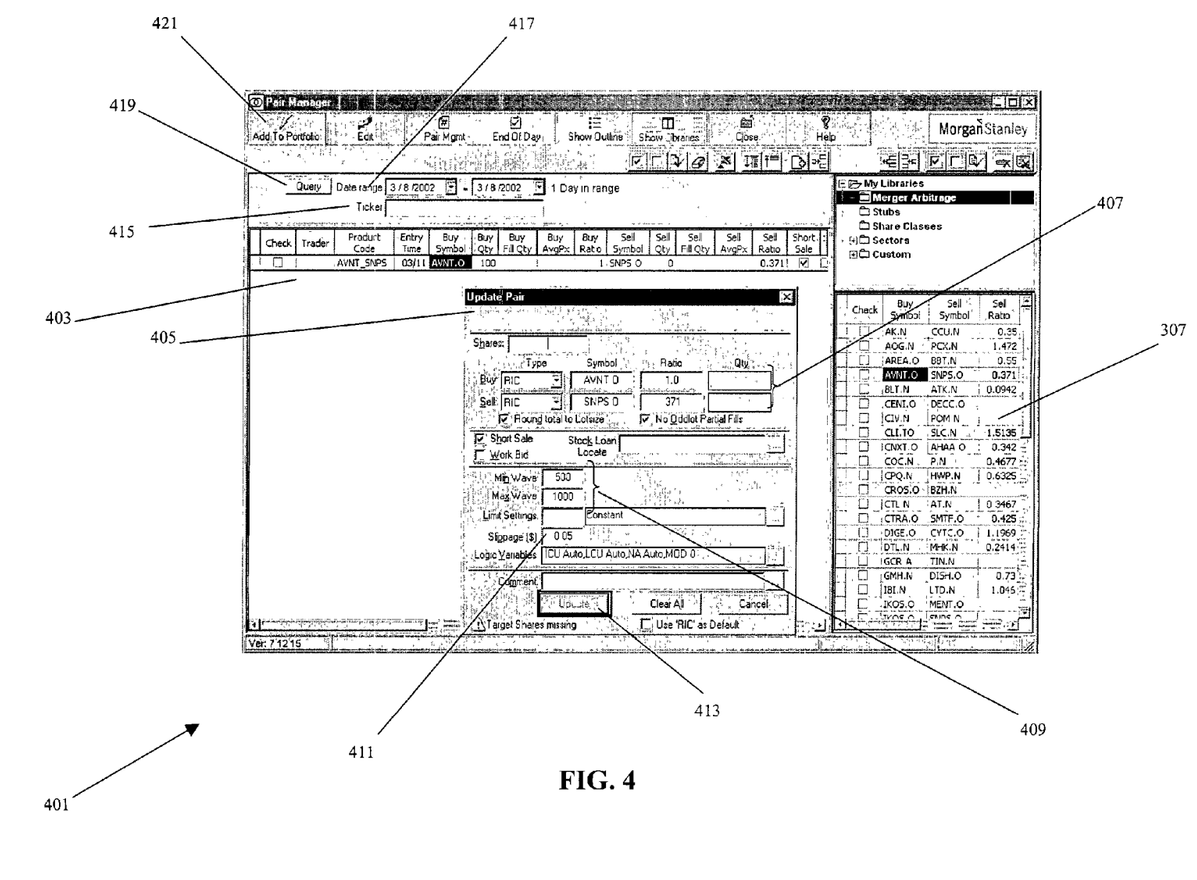
FIG. 4 is a screenshot of a GUI a client uses to modify a pair trade retrieved from the pair library and pair trade archive of FIG. 1.

Referring now to FIG. 4, there is a screenshot 401 of a GUI a client uses to modify a pair trade retrieved from pair library 21. Once the client selects a particular pair trade from search results frame 307, the selected pair trade parameters are displayed in a main frame 403. If the client desires to modify any of the pair trade parameters or supply trade quantities, an update pair pop-up window 405 is provided in which the client can supply/change any of the pair trade parameters. For example, window 405 includes quantity fields 407 in which the buy and sell quantities may be entered, minimum and maximum wave amount fields 409 and a slippage field 411. In addition, the client may use the GUI of screenshot 401 to modify a pair trade retrieved from pair trade archive 17. For example, the client may retrieve past pair trades by either entering reference information into a ticker field 415 or entering a range of dates into a date range field 417 and activating a query button to retrieve the past pair trades that meet the search criteria provided. The retrieved past pair trades are then displayed in main frame 403. Once a past pair trade is retrieved and displayed in main frame 403, the client can update pair pop-up window 405 to supply/change any of the pair trade parameters.

Once the client enters the desired information and activates the "Update" button 413, the parameters associated with the particular pair trade selected in main frame 403 reflect the updates provided by the client. If the parameters for a particular pair trade are satisfactory, the client may then forward a pair trade request based on the selected pair trade to trade fulfillment module 3 for fulfillment. In an exemplary embodiment, the client submits a trade by activating an Add To Portfolio button 421.

Accordingly, a method and a system are provided for trading pair securities in which past pair trades are stored and made available for clients upon which future trades can be based. Also included is a pair library for storing pre-defined pair trades formulated by a skilled pair trader that serves as a template for client pair trade requests. By providing past pair trades and pre-defined pair trades to the client, the client can quickly formulate a pair trade request and forward such request to a pair trade fulfillment module for fulfillment. In this way, the client can take advantage of pair trading opportunities even in fast-moving markets.

A number of embodiments of the present invention have been described. Nevertheless, it will be understood that various modifications may be made without departing from the spirit and scope of the invention. Based on the above description, it will be apparent to one of ordinary skill to implement the system and methods of the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Furthermore, alternate embodiments of the invention that implement the system in hardware, firmware or a combination of both hardware and software, as well as distributing modules and/or data in a different fashion will be apparent to those skilled in the art and are also within the scope of the invention. In addition, it will be apparent to one of ordinary skill to use a conventional database management system such as, by way of non-limiting example, Sybase, Oracle and DB2, as a platform for implementing the present invention. Also, network access devices can comprise a personal computer executing an operating system such as Microsoft Windows™, Unix™, or Apple Mac OS™, as well as software applications, such as a JAVA program or a web browser. Access devices 7 and can also be a terminal device, a palm-type computer, mobile WEB access device or other device that can adhere to a point-to-point or network communication protocol such as the Internet protocol. Computers and network access devices can include a processor, RAM and/or ROM memory, a display capability, an input device and hard disk or other relatively permanent storage. Accordingly, other embodiments are within the scope of the following claims.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

The invention claimed is:

1. A computer-implemented method of trading a pair of securities, comprising the steps of:
retrieving a previously configured pair trade request wherein said previously configured pair trade request includes a plurality of parameters includes parameters from the group including a buy symbol, a buy quantity, a sell symbol, a sell quantity, a buy ratio, a sell ratio, a minimum wave amount, a maximum wave amount, a slippage amount, a wave stop loss unit, a nuisance cancel amount, an improve cancel unit and a minimum order distance; and
submitting said previously configured pair trade request to a computer-implemented pair trade fulfillment module,
wherein at least one of said steps is implemented with a computer.

2. The method of claim 1, further comprising the step of:
archiving at least one past pair trade in a pair trade archive; and
wherein said step of retrieving a previously configured pair trade request includes the step of:
retrieving said at least one past pair trade from said pair trade archive.

3. The method of claim 1, further comprising the step of:
storing at least one pre-defined pair trade request in a pair trade library; and
wherein said step of retrieving a previously configured pair trade request includes the step of:
retrieving said at least one pre-defined pair trade from said pair trade library.

4. The method of claim 3, wherein said at least one pre-defined pair trade is formulated by a pair trader.

5. The method of claim 1, wherein the step of retrieving includes the step of:
retrieving a previously configured pair trade request based on at least one search criteria.

6. The method of claim 5, wherein said at least one search criteria is a date.

7. The method of claim 5, wherein said at least one search criteria is selected from a group including a trader name and a security name.

8. The method of claim 1, wherein said previously configured pair trade request includes a plurality of parameters and further comprising the step of:
modifying at least one of said plurality of parameters.

9. The method of claim 1, wherein said previously configured pair trade request includes a plurality of parameters and further comprising the step of:
providing a shortcut for automatically modifying at least one of said plurality of parameters according to a trading strategy.

10. The method of claim 9, wherein said shortcut is selected from the group including Flip with Short, Flip with Long, Toggle Short and Order Unfilled Quantity.

11. The method of claim 1, wherein said pair trade fulfillment module includes a pair trading engine.

12. The method of claim 1, wherein said pair trade fulfillment module includes a pair crossing network.

13. The method of claim 1, wherein said pair trade fulfillment module includes a pair trading engine and a pair crossing network.

14. A computer-implemented system of trading a pair of securities, comprising:
a computer-implemented pair trade fulfillment module for fulfilling a pair trade request; and
a computer-implemented pair trade store for storing previously configured pair trades;

wherein at least one of said previously configured pair trades is retrieved from said pair trade store and is submitted to said pair trade fulfillment module; and wherein said previously configured pair trade request includes a plurality of parameters includes parameters from the group including a buy symbol, a buy quantity, a sell symbol, a sell quantity, a buy ratio, a sell ratio, a minimum wave amount, a maximum wave amount, a slippage amount, a wave stop loss unit, a nuisance cancel amount, an improve cancel unit and a minimum order distance.

15. The system of claim 14, wherein said pair trade store is a pair trade archive for storing past pair trades.

16. The system of claim 14, wherein said pair trade store is a pair library for storing pre-defined pair trades.

17. The system of claim 16, wherein said at least one pre-defined pair trade is formulated by a pair trader.

18. The system of claim 14, wherein said at least one previously configured pair trade is retrieved based on at least one search criteria.

19. The system of claim 18, wherein said at least one search criteria is a date.

20. The system of claim 18, wherein said at least one search criteria is selected from a group including a trader name and a security name.

21. The system of claim 14, wherein said at least one of said previously configured pair trade includes a plurality of parameters and at least one of said plurality of parameters is modified.

22. The system of claim 14, wherein said at least one of said previously configured pair trades includes a plurality of parameters and further comprising a shortcut for automatically modifying at least one of said plurality of parameters according to a trading strategy.

23. The system of claim 22, wherein said shortcut is selected from a group including Flip with Short, Flip with Long, Toggle Short and Order Unfilled Quantity.

24. The system of claim 14, wherein said pair trade fulfillment module includes a pair trading engine.

25. The system of claim 14, wherein said pair trade fulfillment module includes a pair crossing network.

26. The system of claim 14, wherein said pair trade fulfillment module includes a pair trading engine and a pair crossing network.

27. A computer-implemented method of trading a pair of securities, comprising the steps of:

retrieving a previously configured pair trade request, said previously configured pair trade request includes a plurality of parameters includes parameters from the group including a buy symbol, a buy quantity, a sell symbol, a sell quantity, a buy ratio, a sell ratio, a minimum wave amount, a maximum wave amount, a slippage amount, a wave stop loss unit, a nuisance cancel amount, an improve cancel unit and a minimum order distance;

modifying at least one of said plurality of parameters; and submitting said previously configured pair trade request to a computer-implemented pair trade fulfillment module, wherein at least one of the steps is implemented with a computer.

* * * * *